J. J. O'MARA.
PERCOLATOR.
APPLICATION FILED APR. 10, 1911.

1,064,530.

Patented June 10, 1913.

WITNESSES

INVENTOR
John J. O'Mara
BY
ATTORNEYS

UNITED STATES PATENT OFFICE.

JOHN J. O'MARA, OF NEW YORK, N. Y.

PERCOLATOR.

1,064,530.

Specification of Letters Patent. Patented June 10, 1913.

Application filed April 10, 1911. Serial No. 620,090.

*To all whom it may concern:*

Be it known that I, JOHN J. O'MARA, a citizen of the United States, and a resident of the city of New York, borough of Brooklyn, in the county of Kings and State of New York, have invented a new and Improved Percolator, of which the following is a full, clear, and exact description.

This invention relates to percolators, for use in making infusions from different substances, for example, from coffee, and has reference more particularly to a device of this class which comprises a main vessel, a heating chamber associated therewith and having an outlet part projecting into the main vessel, a percolating tube adapted to convey heated fluid from the heating chamber to the material from which the infusion is to be made, and a telescopic union for removably connecting the tube and the outlet part of the heating chamber, the union having a tortuous passage whereby fluid can enter the heating chamber from the main vessel.

The object of the invention is to provide a simple, inexpensive and efficient percolator which can be used for making coffee or other infusions, which is rapid in operation, which can be inexpensively manufactured, and can be produced in various sizes and forms, which, when in use requires practically no attention, in which no mechanically movable valve element is employed to control the entrance of the fluid from the main vessel into the heating chamber, which nevertheless is so constructed that the fluid from the heating chamber cannot return to the main vessel but is constrained to pass through the percolating tube, and which is so constructed that the union between the percolating tube and the heating chamber, which forms the connecting passage between the main vessel and the heating chamber, can be easily taken apart, and can be kept clean with little difficulty.

The invention consists in the construction and combination of parts to be more fully described hereinafter and particularly set forth in the claims.

Reference is to be had to the accompanying drawings, forming a part of this specification, in which similar characters of reference indicate corresponding parts in both views, and in which—

Figure 1:
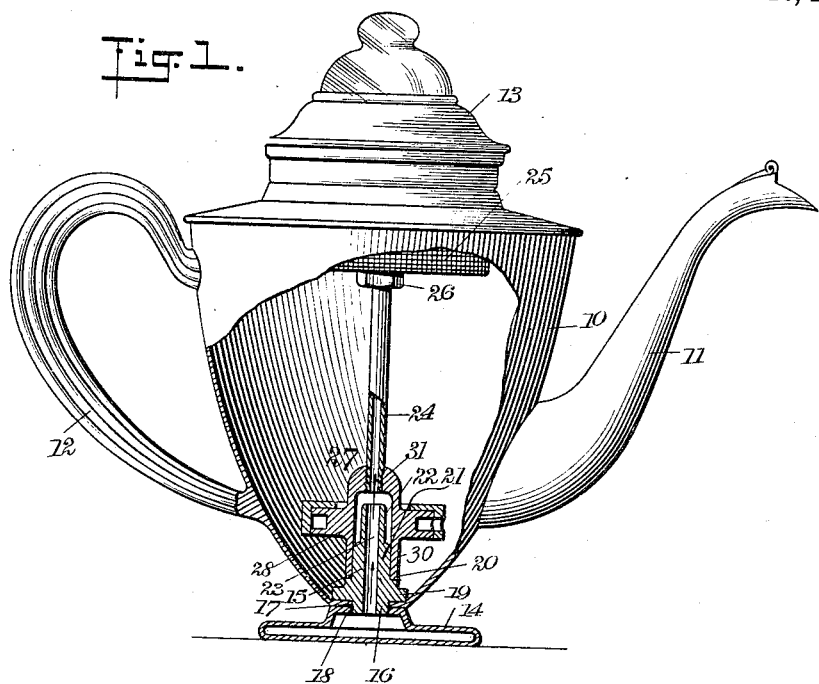
Figure 2:
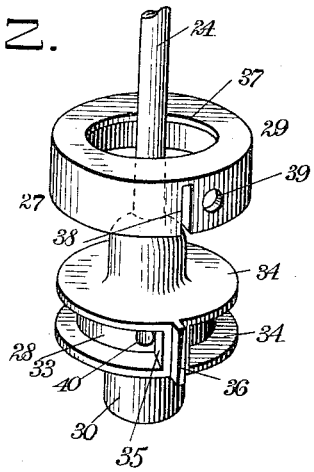

Figure 1 is a side elevation of a coffee pot having an embodiment of my invention applied thereto, certain of the parts being shown in vertical section; and Fig. 2 is an enlarged perspective view of the union, showing the parts thereof separated to permit the same to be cleaned.

Before proceeding to a more detailed explanation of my invention, it should be clearly understood that while the same is particularly useful as a coffee percolator, it can also be applied to different devices for making infusions. I am aware that percolators have already been proposed, in which movable, mechanical valve members controlling the entrance of the fluid into the heating chamber are dispensed with, and are replaced by tortuous passages which are so constructed that the heated fluid in escaping from the heating chamber will traverse the percolating tube rather than return through the tortuous passage. Many of these devices labor under the disadvantage that it is extremely difficult to keep the tortuous passage properly cleaned. I employ however, as will appear hereinafter, a union which is telescopic, so that it can be easily taken apart, and can be cleansed without difficulty. Certain of the details of construction, shown for example, herewith, form no part of the invention, and can be varied in accordance with individual preference and special conditions, without departing from the essence of the invention as defined in the appended claims.

Referring more particularly to the drawings, I have shown, for example, herewith, a coffee pot having a main vessel or body 10, provided with the usual spout 11 and the handle 12. The vessel also has a cover 13 of any suitable form. At the bottom is located a heating chamber 14, which consists, for example, of the flattened base portion, and a reduced part upon which the lower end of the main vessel rests. Associated with the heating chamber is a tubular element 15, which virtually forms the outlet part of the heating chamber, and has at the lower end a reduced, threaded portion 16, extended through an opening 17 in the bottom of the main vessel, and screwed into a correspondingly threaded opening 18 of the upper portion of the heating chamber. The outlet part or neck has a laterally extended flange 19 which seats upon the bottom of the vessel. Above the flange 19, the neck has a shoulder 20, and successively reduced parts 21 and 22. The passage 23 through the part 15 effects communication between the main vessel and the heating chamber, and is substantially alined with the passage of the percolating tube 24.

At the upper end of the percolating tube is carried the usual basket or compartment 25, secured in place by means of a nut 26, and adapted to contain the ground coffee or other substance from which the infusion is to be made. At the lower end, the percolating tube is threaded, and is secured to the union 27 by having the threaded part screwed into a suitably threaded opening of one of the union elements as will appear hereinafter.

The union comprises two telescopic members 28 and 29. The former of these has a tubular body 30, by means of which it is removably mounted upon the outlet part 15, the lower end of the body being open, and seating at the shoulder 20, so that the respective parts 21 and 22 of the outlet neck project into the body, the part 21 fitting snugly therein. The upper part of the element 30 has a threaded opening 31 which receives the correspondingly threaded end of the percolating tube. Intermediate its ends, the part 28 is enlarged to form a circular, lateral extension 33 having at the upper and lower edges, further, radially extended flanges 34. These are integrally connected at one point by a wall 35 which is extended beyond the edges of the flanges, to form a wing 36. The other part, 29, of the union, consists of an annular collar having at the upper edge an inwardly disposed radial flange 37, and at one side a notch or recess 38 extending upwardly from the lower edge. The collar fits upon the extension of the member 30 and lies closely against the edges of the flanges 34, the flange 37 resting upon the upper flange 34, as is clearly shown in Fig. 1. The wing 36 is received in the notch 38, and holds the two parts of the union against turning relative to one another.

The space between the flanges 34 and the collar 29 forms a circular passage when the parts of the union are assembled. The collar has at one side of the notch 38 and adjacent thereto, an opening 39. The extension 33 of the part 28 has a similar opening 40 at the opposite side of the wall 35. Consequently, the fluid enters from the main vessel through the opening 39, and must pass all the way around the tortuous passage formed in the union, before it can enter through the opening 40, to fill the heating chamber through the passage 28.

It will be understood that the operation of the present form of the percolator is the usual one. The fluid in the heating chamber is heated rapidly and when heated will escape suddenly through the outlet part of the heating chamber, and pass up through the percolating tube, to the substance in the basket 25. As soon as the heating chamber is empty, a further supply of fluid will enter from the main vessel, through the tortuous passage. This will in turn be heated, and the operation will be repeated as long as heat is applied under the heating chamber. It is easier for fluid escaping from the heating chamber to pass straight up through the percolating tube as indicated by the arrow, than to return to the main vessel, through the tortuous passage, against the pressure of the fluid in the main vessel. It is of course a simple matter to keep the parts of the percolator in a clean and sanitary condition. The cover is removed from the passage, and the percolating tube is displaced therefrom, together with the parts associated with the percolating tube, i. e., the basket and the union. The respective parts of the union can be separated by removing the collar from the part 28, whereupon easy access can be had to the passage.

Having thus described my invention, I claim as new, and desire to secure by Letters Patent:

1. A device of the class described comprising a main vessel, a heating chamber associated therewith and having an outlet, a percolating tube adapted to convey heated fluid to the material from which the infusion is to be made, and a union for removably connecting said tube and said outlet part of said chamber, said union comprising two telescoping members forming therebetween a single circular interrupted passage for the entrance of fluid into said chamber from said main vessel, one of said members having a notch, the other of said members having an extension adapted to be received in said notch and forming therewith an interlocking connection, preventing a relative turning movement of said members when said union is assembled.

2. A device of the class described comprising a main vessel; a heating chamber associated therewith and having an outlet part; a percolating tube adapted to convey heated fluid to the material from which the infusion is to be made; and a union for removably connecting said tube and said outlet part of said heating chamber, said union comprising a member having spaced flanges and a wall between said flanges, said member having an opening at one side of said wall and a collar adapted to sit upon said flanges and forming therewith a single circular interrupted passage, said interruption being formed by said wall between said flanges, said collar having an opening at a point corresponding to the side of said wall remote from said opening of said first member.

3. A device of the class described, comprising a main vessel, a heating chamber associated therewith and having an outlet part, a percolating tube adapted to convey heated fluid to the material from which the infusion is to be made, and a union for removably connecting said tube and said outlet part of said chamber, said union comprising a tubular member adapted to receive said outlet part telescopically, and having spaced flanges, a wall between said flanges, having an extension projecting beyond said flanges, and a collar adapted to be separably associated with said member, and engaging at said flanges, said collar having a notch adapted to receive said extension, and having an opening at one side of said notch, said tubular member having an opening at one side of said wall communicating with the interior of said member.

4. In a device of the class described, a union for removably connecting the percolating tube and the heating chamber, said union comprising a member having spaced flanges and a wall between said flanges, said member having an opening at one side of said wall, and a collar adapted to seat upon said flanges and forming therewith a tortuous passage, said collar having an opening at a point corresponding to the side of said wall remote from said opening of said first member.

5. In a device of the class described, a union for removably connecting the percolating tube and the heating chamber, said union comprising a member having spaced flanges and a wall between said flanges, said member having an opening at one side of said wall, and a collar adapted to seat upon said flanges and forming therewith a tortuous passage, said collar having an opening at a point corresponding to the side of said wall remote from said opening of said first member, said members having respectively an extension and a notch forming an interlocking connection, whereby said members, when said union is assembled, are in predetermined relative positions.

In testimony whereof I have signed my name to this specification in the presence of two subscribing witnesses.

JOHN J. O'MARA.

Witnesses:
 JOHN K. BRAEHVOGEL,
 PHILIP D. ROLLHAUS.

---

Copies of this patent may be obtained for five cents each, by addressing the "Commissioner of Patents, Washington, D. C."